United States Patent
Lai

(10) Patent No.: US 8,157,286 B2
(45) Date of Patent: Apr. 17, 2012

(54) STROLLER

(76) Inventor: Chin-I Lai, Tainan County (TW)

(*) Notice: Subject to any disclaimer, the term of this patent is extended or adjusted under 35 U.S.C. 154(b) by 279 days.

(21) Appl. No.: 12/709,066

(22) Filed: Feb. 19, 2010

(65) Prior Publication Data

US 2011/0204600 A1 Aug. 25, 2011

(51) Int. Cl.
*B62B 1/00* (2006.01)
*B62B 3/00* (2006.01)
(52) U.S. Cl. ......... 280/647; 280/642; 280/639; 280/650
(58) Field of Classification Search ............... 280/647, 280/642, 650, 639, 646
See application file for complete search history.

(56) References Cited

U.S. PATENT DOCUMENTS

| | | | | |
|---|---|---|---|---|
| 4,386,790 A * | 6/1983 | Kassai | ........................ | 280/650 |
| 6,073,957 A * | 6/2000 | Lan | ........................ | 280/642 |
| 7,188,858 B2 * | 3/2007 | Hartenstine et al. | ........ | 280/642 |
| 7,367,581 B2 * | 5/2008 | Yang | ........................ | 280/642 |
| 7,401,803 B1 * | 7/2008 | Lai | ........................ | 280/647 |
| 7,410,185 B2 * | 8/2008 | Chen et al. | ................ | 280/642 |
| 7,410,186 B2 * | 8/2008 | Hartenstine et al. | ........ | 280/643 |
| 7,584,985 B2 * | 9/2009 | You et al. | ................ | 280/643 |
| 7,766,366 B2 * | 8/2010 | Li | ........................ | 280/642 |
| 7,780,183 B2 * | 8/2010 | Chen et al. | ................ | 280/647 |
| 2003/0193172 A1 * | 10/2003 | Lin | ........................ | 280/642 |
| 2008/0029983 A1 * | 2/2008 | Yang | ........................ | 280/47.38 |

* cited by examiner

*Primary Examiner* — J. Allen Shriver, II
*Assistant Examiner* — James M Dolak
(74) *Attorney, Agent, or Firm* — Muncy, Geissler, Olds & Lowe, PLLC

(57) ABSTRACT

A stroller comprises a pair of support racks, a handlebar, a linking rack, a pair of folding drivers, a folding control set, a plurality of front wheels and a rear wheel set. The handlebar is bent and slidable on the front tube and has two ends close to the front tube to hold the folding drivers and the folding control set inside at corresponding locations. The folding control set controls the folding drivers to allow the handlebar to slide on the support racks. The handlebar can pull the rear tube through the linking rack to move towards the front tube for folding. Extension and folding can be accomplished singlehanded. The front wheels are fastened to the lower end of the front tube and can be set in a selected direction in advance. The rear wheel set contains a synchronous brake means to brake two rear wheels synchronously.

10 Claims, 17 Drawing Sheets

STROLLER

FIELD OF THE INVENTION

The present invention relates to a stroller which can be configured between an extended state and a folded state single-handed.

BACKGROUND OF THE INVENTION

A stroller mainly aims to carry and transport an infant or smaller child outdoors. It usually has to be folded and shrunk to a smaller size for transportation and storage. To meet this purpose many types of folding structure have been developed. Most of them require users to do extension and folding with two hands, but cannot be folded and extended singlehanded. While they usually provide a frame with a plurality of hinged joints to facilitate folding and shrinking, they mostly do not have desired stability and strong enough joints during extended condition, especially on the handlebar portion. Falling apart of elements could happen.

Moreover, when moving the front wheels of the stroller straight ahead without turning to the left or right side is desired, the wheels have to be set in a forward moving state. Adjustment of direction setting for the wheels is difficult. In the event that the two front wheels are not being set in a uniform direction the stroller tends to be bumpy during moving and require a lot of efforts to move and maneuver. The infant or child sitting inside could be jolted and feel uncomfortable.

SUMMARY OF THE INVENTION

The primary object of the present invention is to overcome the disadvantages of the conventional stroller that cannot be folded and extended singlehanded and has an unstable frame and deficient joint strength and needs manual adjustment in setting the direction of the front wheels.

To achieve the foregoing object the present invention provides a stroller that includes a pair of folding drivers operable singlehanded to control an elastic pin in the folding drivers to cooperate with a extension hole or a retraction hole to allow a handlebar sliding on a front tube, and a rear tube coupled with the handlebar through a linking rack moves to the front tube by a coupling holder to be folded or extended relative to the front tube, wherein the coupling holder acts as a circular center relative to the rear tube. A folding control set s has a safety lock to butt a depression seat so that the folding driver is locked and cannot be depressed to prevent inadvertent depression and folding. A direction setting member of front wheels is provided and movable for direction setting prior to direction setting of the front wheels so that the stroller can automatically latch on a direction setting seat to set direction during moving of the stroller. Rear wheels at two sides are provided and linked to each other through a movement link. A primary brake and a release pedal are provided that can be stepped by a user's foot to drive a secondary brake on another side to activate braking or release braking.

By means of the aforesaid structure the stroller of the invention provides many benefits, notably:

1. The design of the handlebar, the folding control set and the folding driver allow users to extend the stroller in a fixed state or fold the stroller singlehanded.
2. The folding control set provides lock function to prevent inadvertent activation of folding by users.
3. The front wheels have automatic direction setting function by a simple movement without manual setting in advance.
4. The rear wheels at two sides provide brake function synchronously to enhance safety of the stroller.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
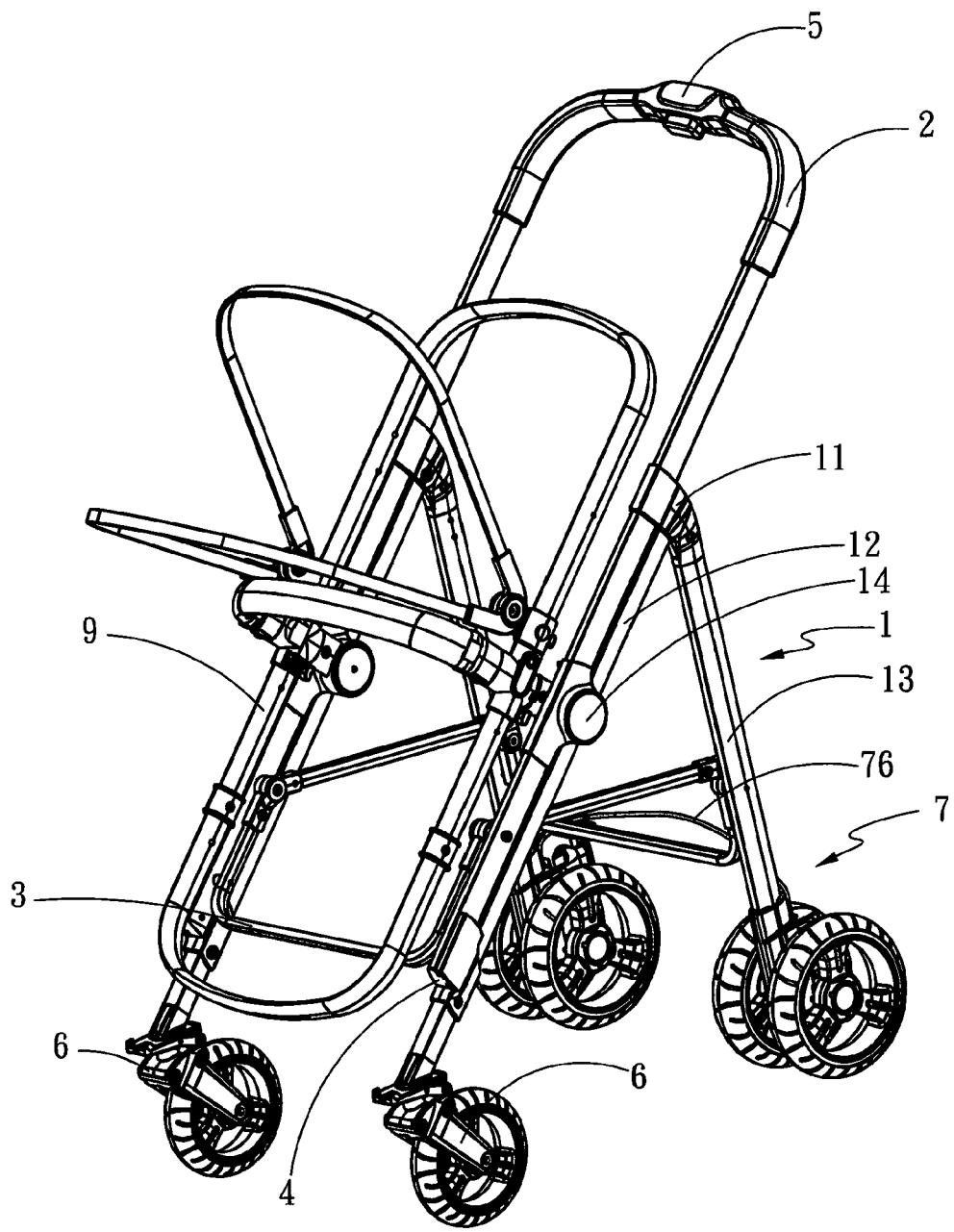
FIG. 1 is a perspective view of the stroller of the present invention.
Figure 2:
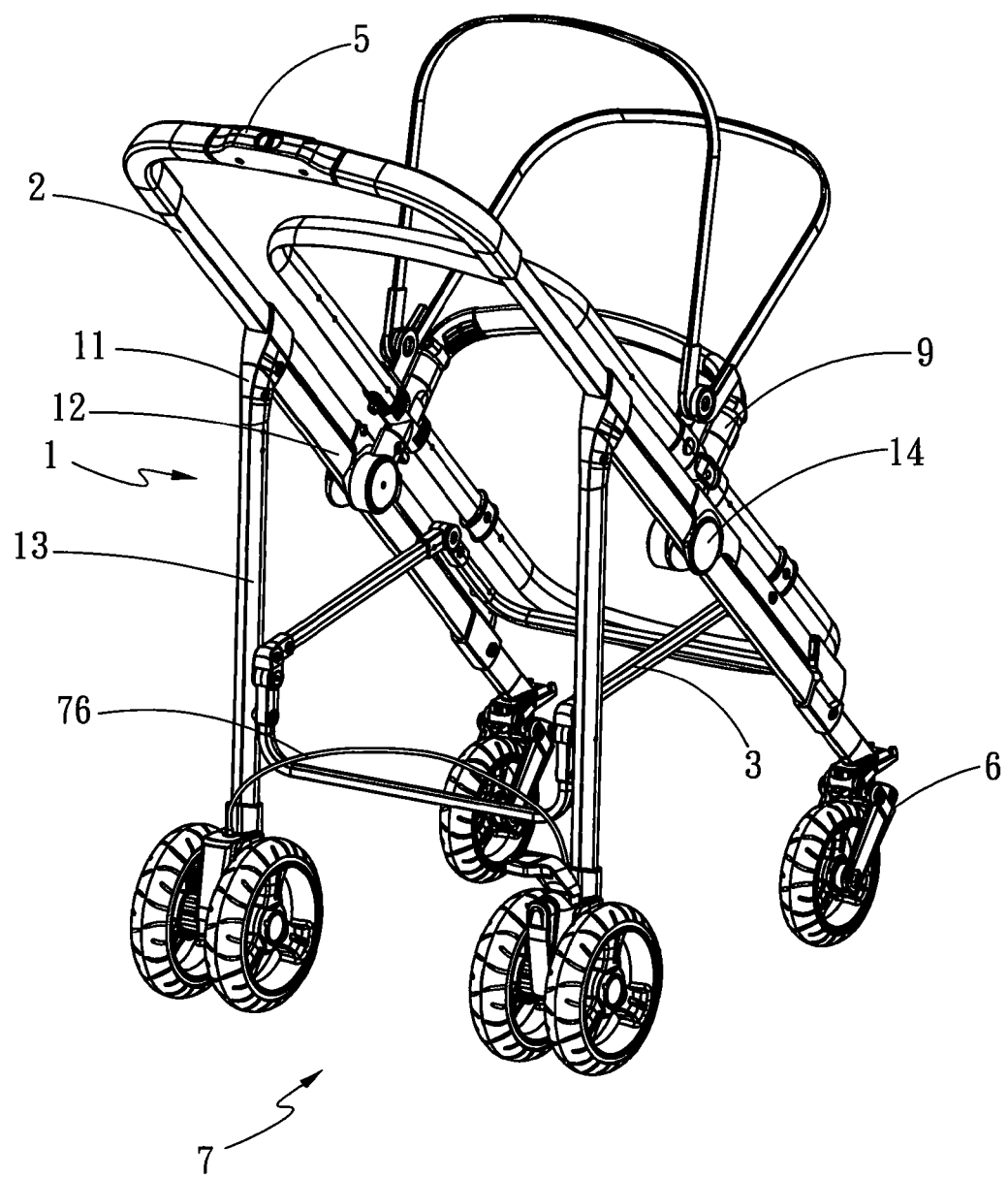
FIG. 2 is back view of the stroller of the present invention.

Please referring to FIGS. 1 and 2, the present invention relates to a stroller, comprising a pair of support racks 1, a handlebar 2, a linking rack 3, a pair of folding drivers 4, a folding control set 5, a plurality of front wheels 6 and a rear wheel set 7.

Figure 3:
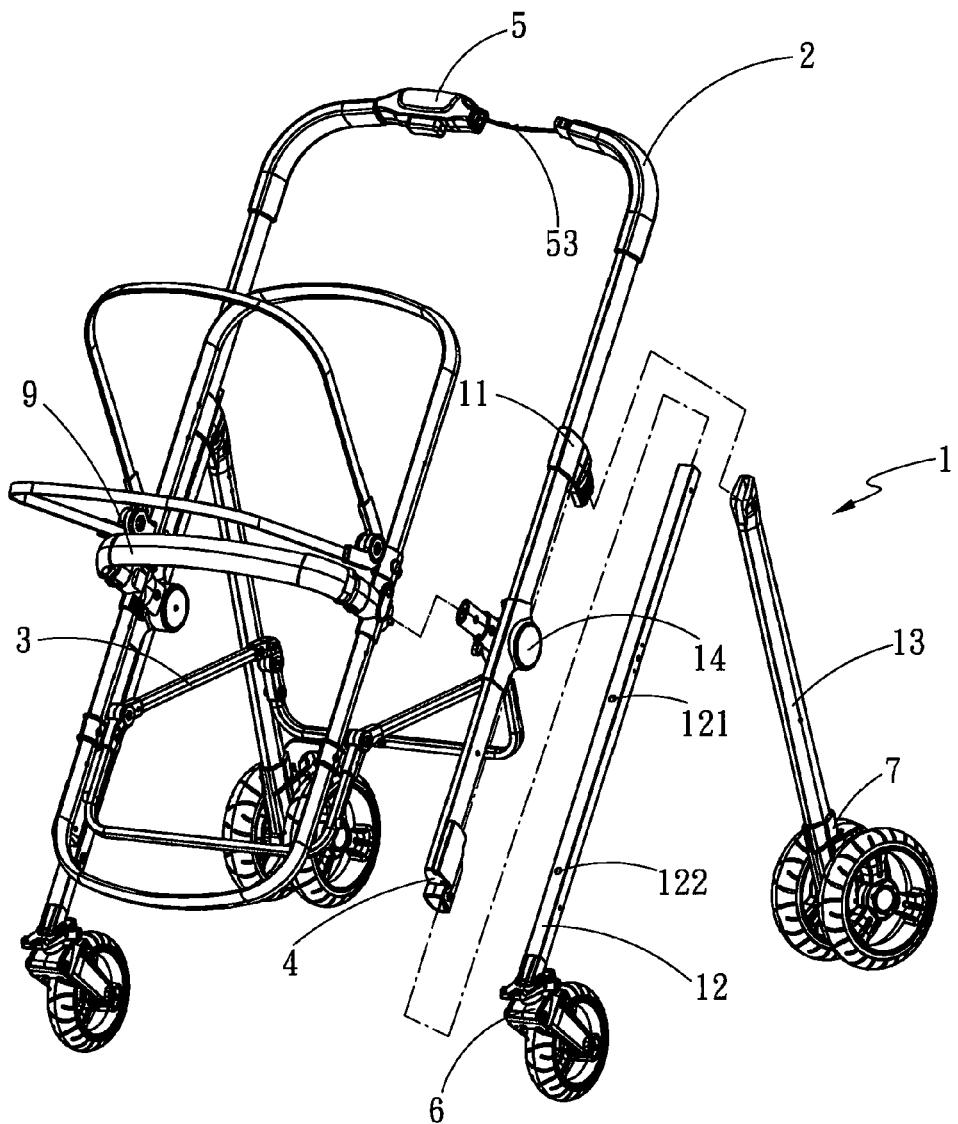
FIG. 3 is a schematic view of the support rack of the present invention.

Also referring to FIGS. 1 and 3, each of the support racks 1 has a coupling holder 11 which has a lower side fastened to a front tube 12 and hinged by a rear tube 13. The rear tube 13 is turnable towards the front tube 12 for folding. The front tube 12 has an extension hole 121 near the middle portion, a retraction hole 122 near the lower end, and a coupling seat 14 at the middle portion to couple with a seat frame 9. The seat frame 9 can hold an infant basket or a car seat.

Figure 5A:
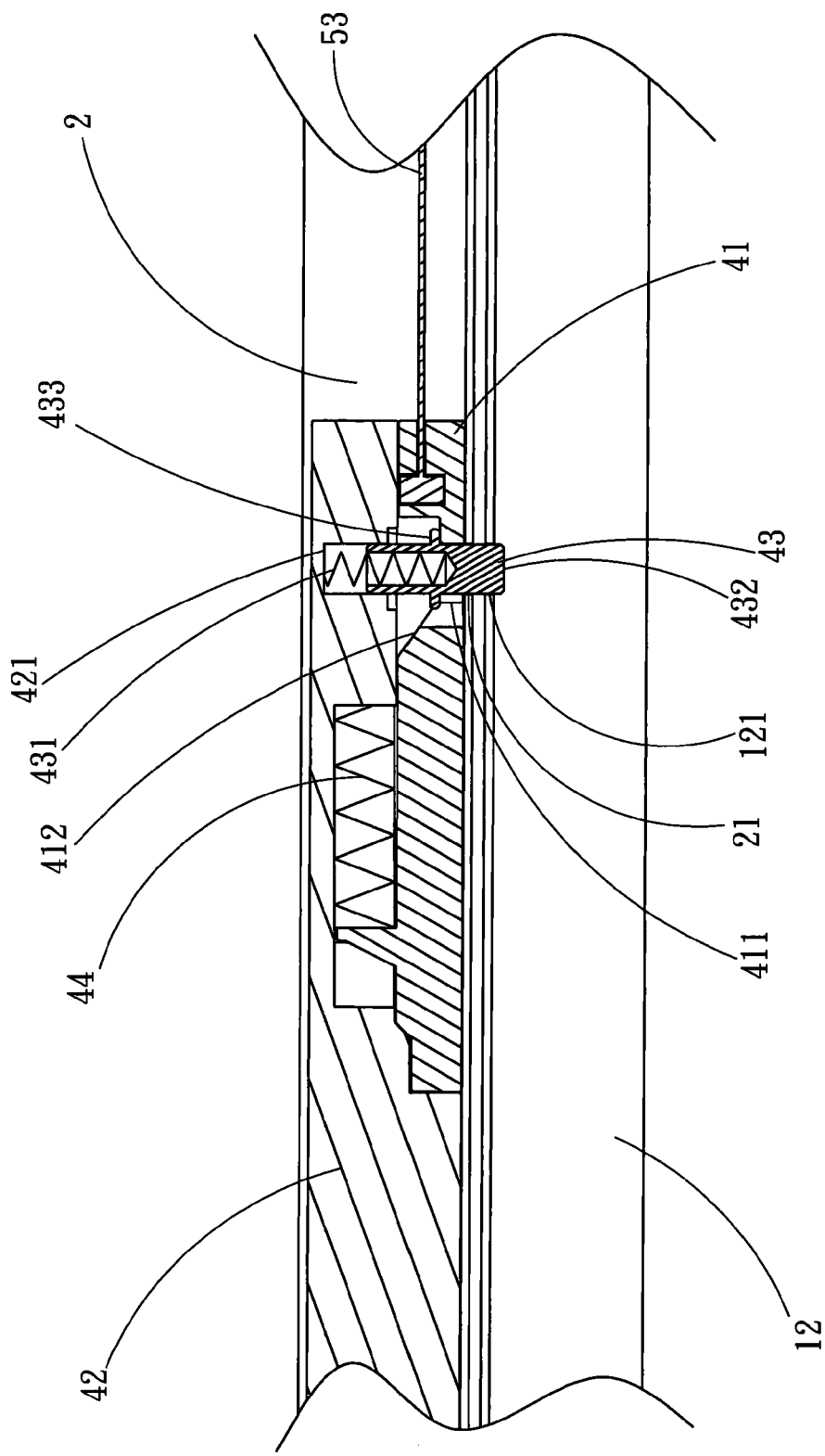
FIG. 5A is a sectional view of the folding driver of the present invention.
Figure 5B:
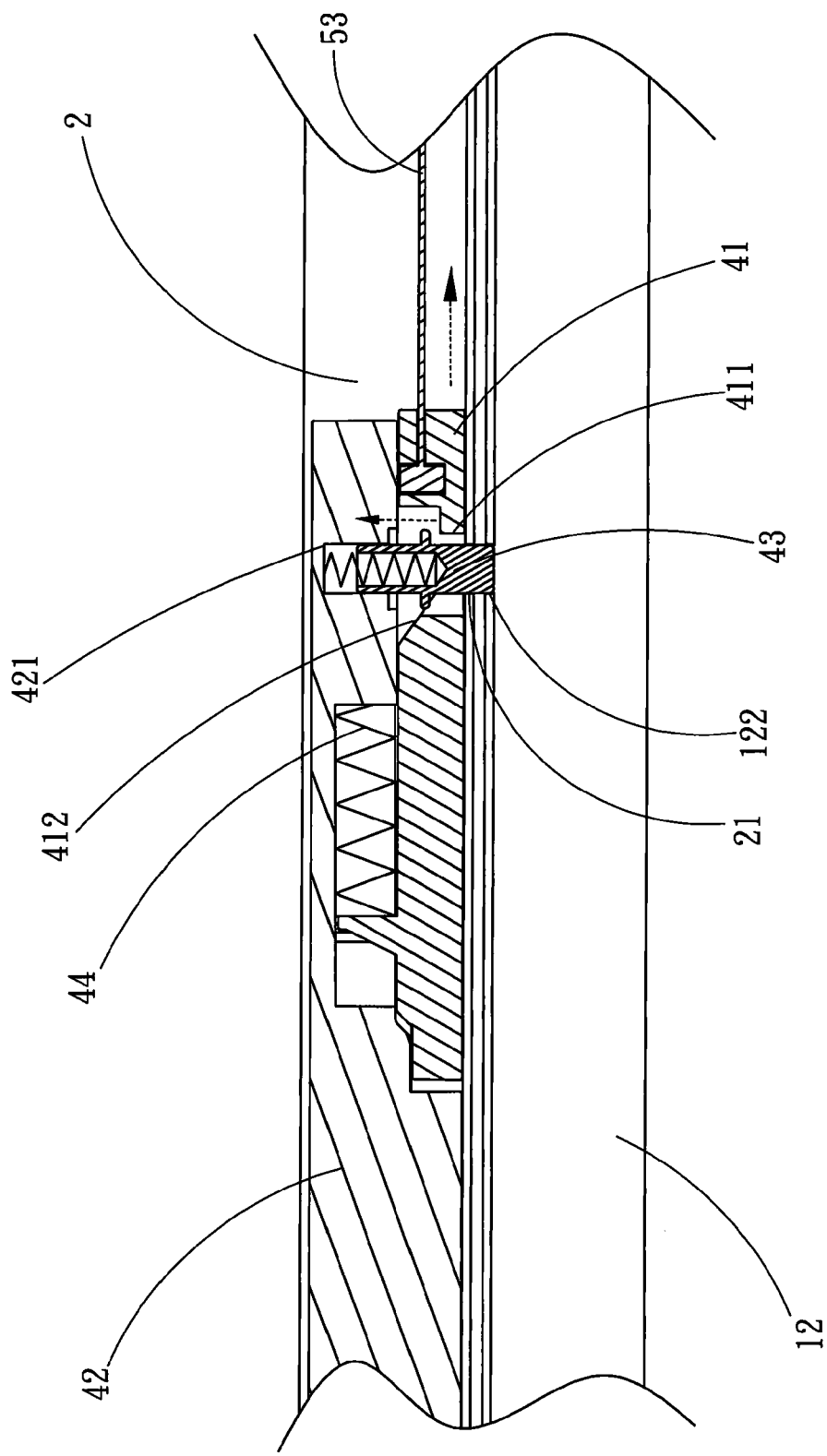
FIG. 5B is a sectional view of the folding driver of the present invention in an operating condition.
Figure 5C:
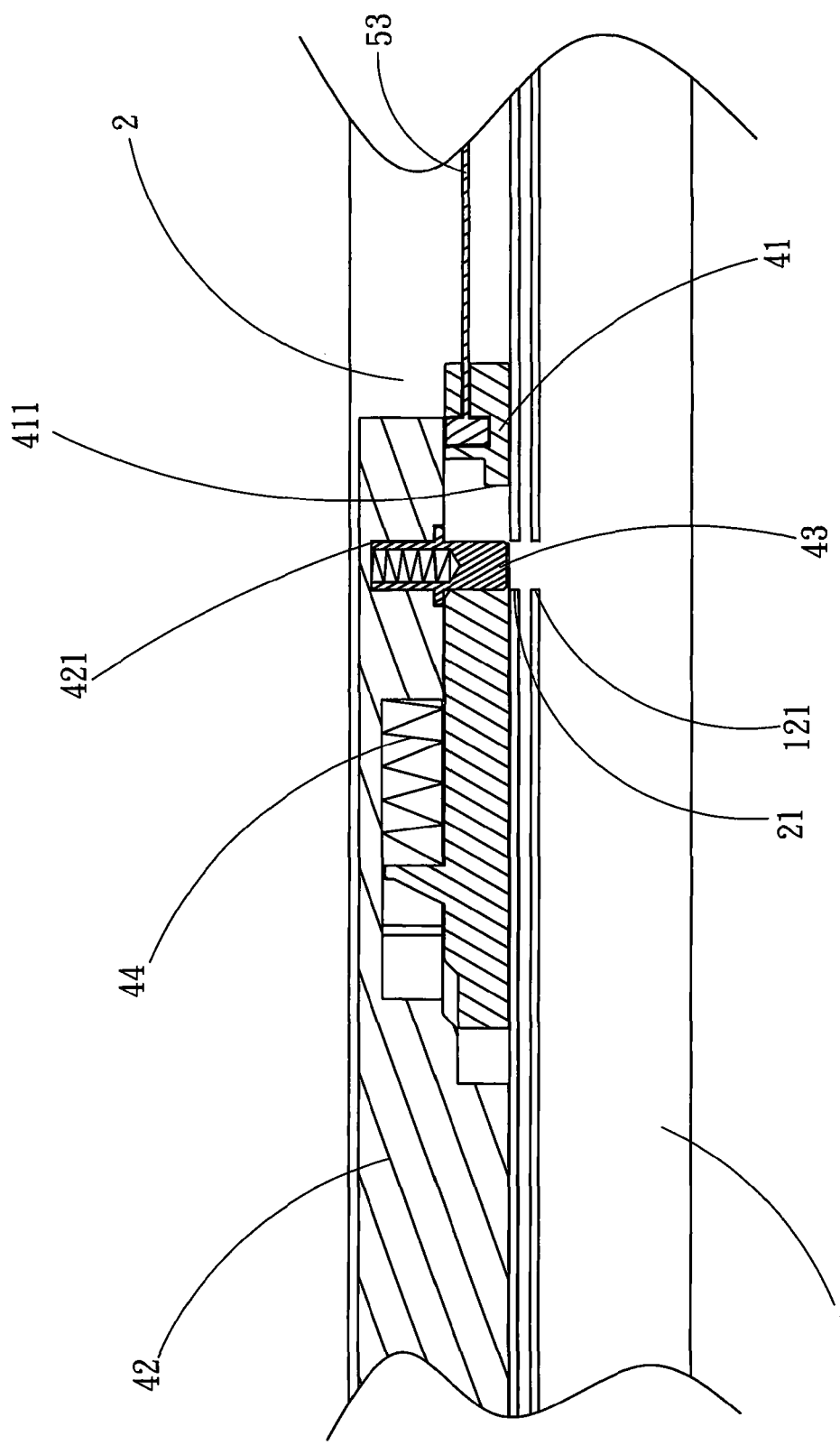
FIG. 5C is a sectional view of the folding driver of the present invention after operation finished.
Figure 6:
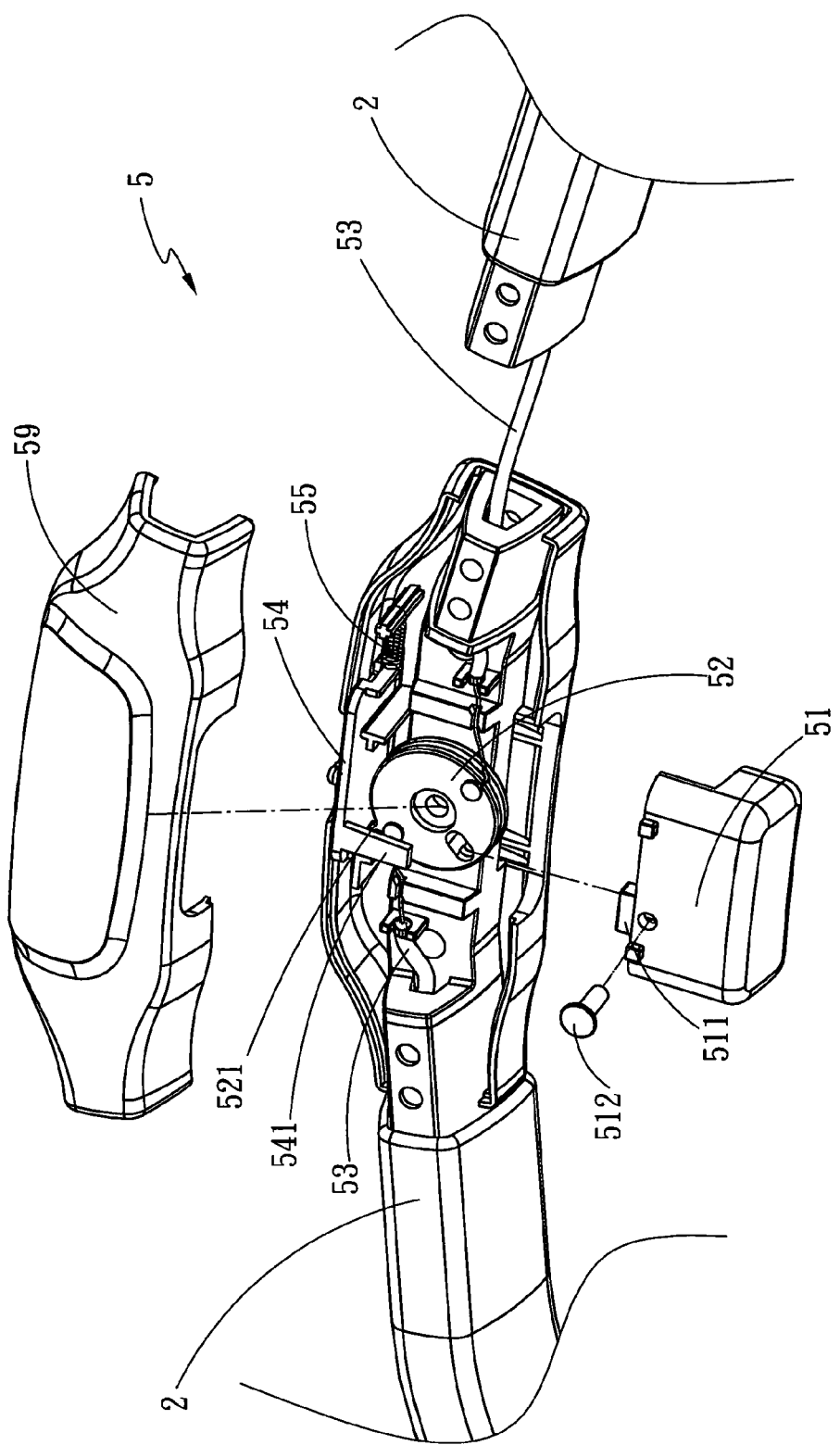
FIG. 6 is a schematic view of the folding control set of the present invention in a coupling condition.
Figure 7A:
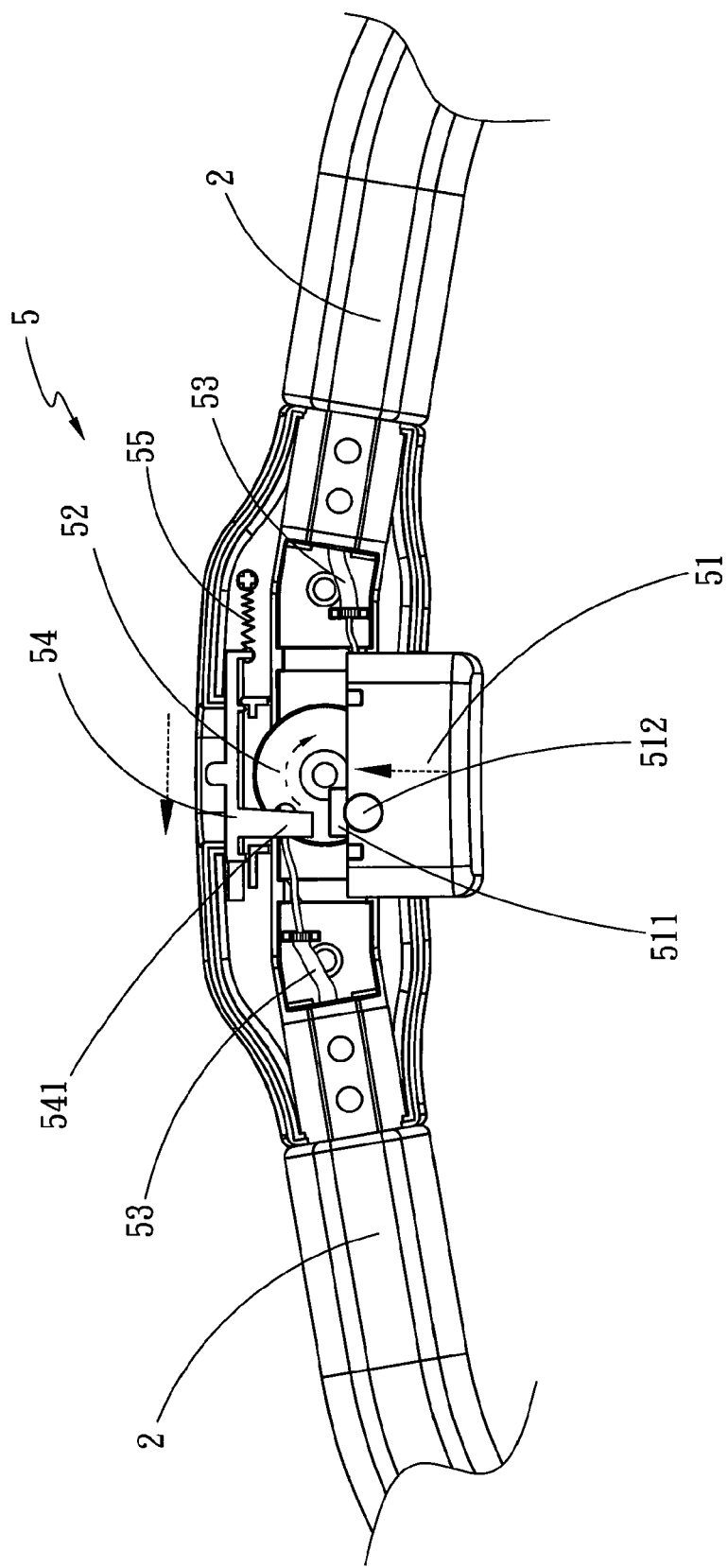
FIG. 7A is a schematic view of the folding control set of the present invention in an operating condition.
Figure 7B:
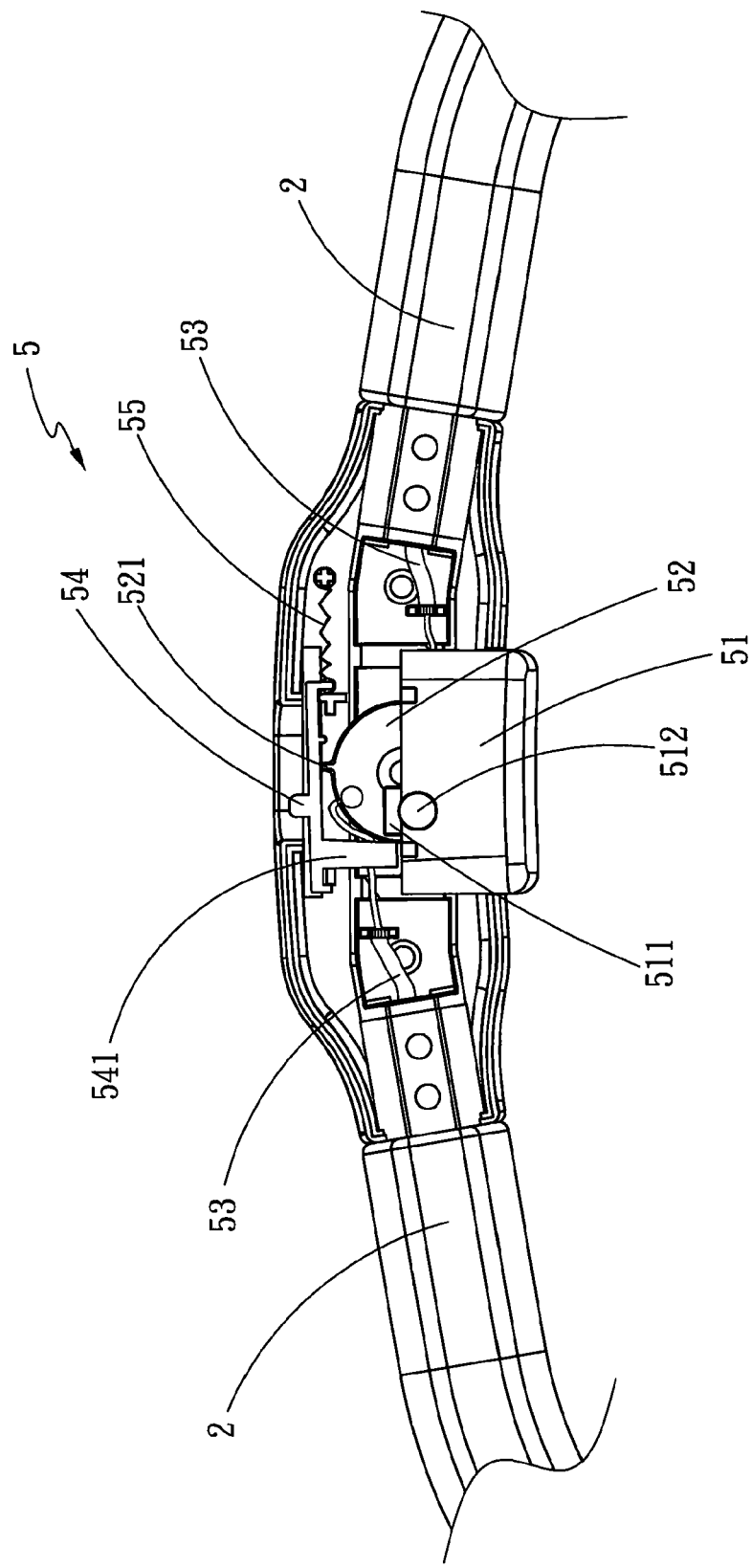
FIG. 7B is a schematic view of the folding control set of the present invention after operation finished.

Referring to FIGS. 1, 3 and 5A, the handlebar 2 is a bent tube with two ends fastened to the front tube 12 of the support racks 1 and slidable on the front tube 12, and has an aperture 21 corresponding to the extension hole 121.

Referring to FIGS. 1 and 2, the linking rack 3 connects to the rear tube 13 and the handlebar 2 to form a linking mechanism for folding.

Figure 4:
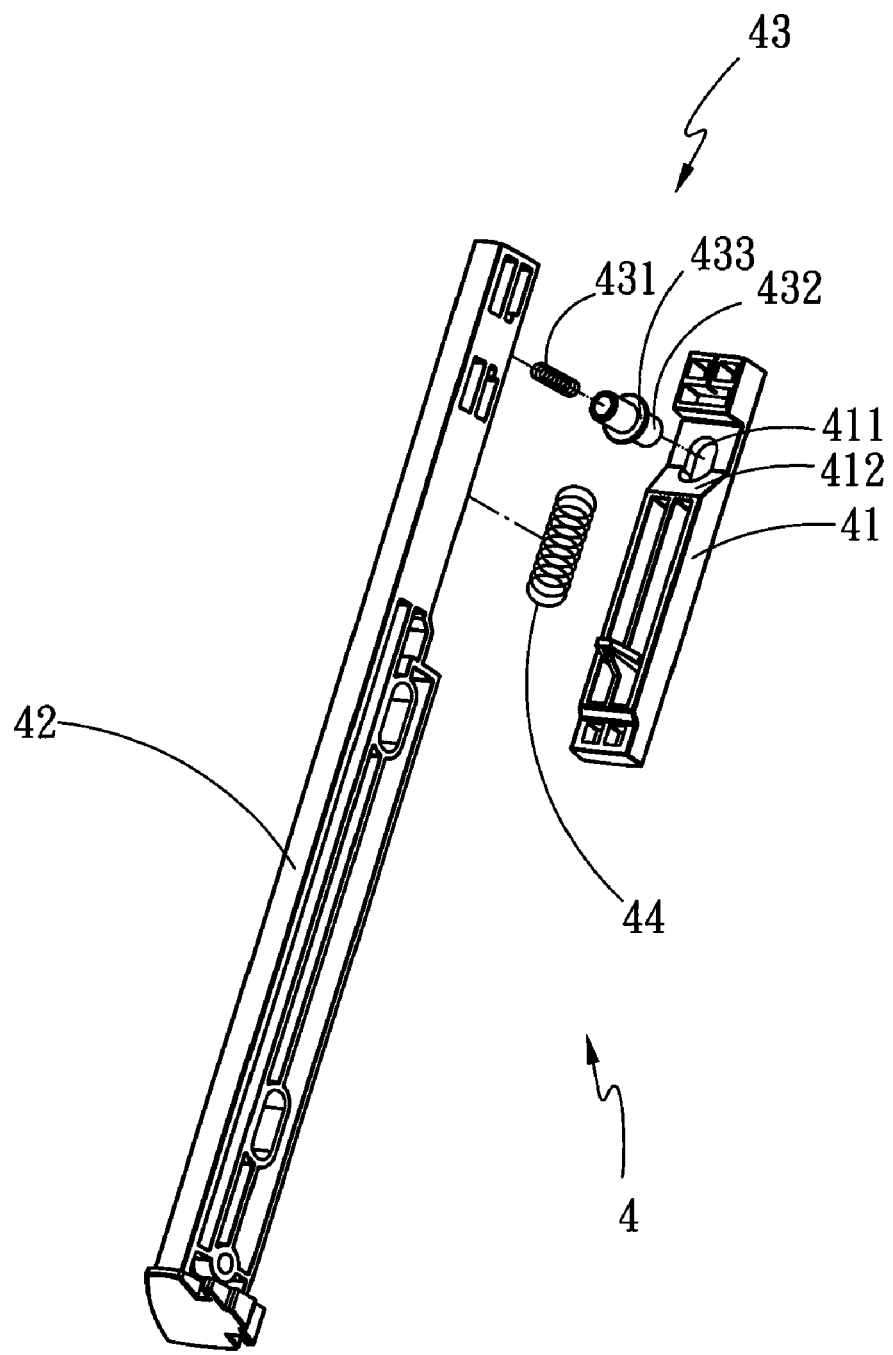
FIG. 4 is a schematic view of the folding driver of the present invention in a coupling condition.

Referring to FIGS. 1, 4 and 5A, the folding drivers 4 are embedded in two ends of the handlebar 2 corresponding to the front tube 12 to control sliding and anchoring of the handlebar 2 on the front tube 12. It comprises a lower driving lump 41, an upper driving lump 42, an elastic pin 43 and an elastic member 44. The lower driving lump 41 has a pin hole 411 corresponding to the aperture 21 of the handlebar 2 and a trough 412 around the pin hole 411. The elastic pin 43 runs through the pin hole 411 and includes an upper end coupled with an elastic element 431 and a lower end formed a pin 432, and a washer 433 near the middle portion formed at a size greater than the diameter of the another pin 432. The upper driving lump 42 and the lower driving lump 41 are slidable relative to each other. The upper driving lump 42 has an upper trough 421 to hold the elastic element 431 to butt the elastic pin 43. The elastic member 44 is interposed between the upper and lower driving lumps 42 and 41 to drive them sliding in opposite directions to return to their corresponding positions.

Referring to FIGS. 1, 5A, 6 and 7A, the folding control set 5 is installed on the handlebar 2 corresponding to the folding driver 4 to control the folding driver 4. It comprises a pressing seat 51, a rotary disk 52, two flexible links 53, a safety lock 54 and an elastic component 55. The pressing seat 51 is hinged on the rotary disk 52 through a hinge element 512 to form an eccentric coupling relationship for turning the rotary disk 52 by pressing the pressing seat 51. The pressing seat 51 has a boss 511 close to the circular center of the rotary disk 52. The rotary disk 52 has a lug 521 at a selected position on the perimeter and holds the flexible links 53 at symmetrical locations inside. The flexible links 53 connects and draws the lower driving lump 41 to control the handlebar 2 to slide and anchor on the front tube 12 through the folding control set 5. The safety lock 54 is slidable on the handlebar 2 close to the lug 521 of the rotary disk 52, and has a detent portion 541 corresponding to the boss 511. The detent portion 541 aims to stop the boss 511 to prevent the pressing seat 51 from moving towards the circular center. The safety lock 54 is movable reciprocally on the handlebar 2 through the coupled elastic component 55. The folding control set 5 is covered by a cap 59 for protection.

Figure 8:
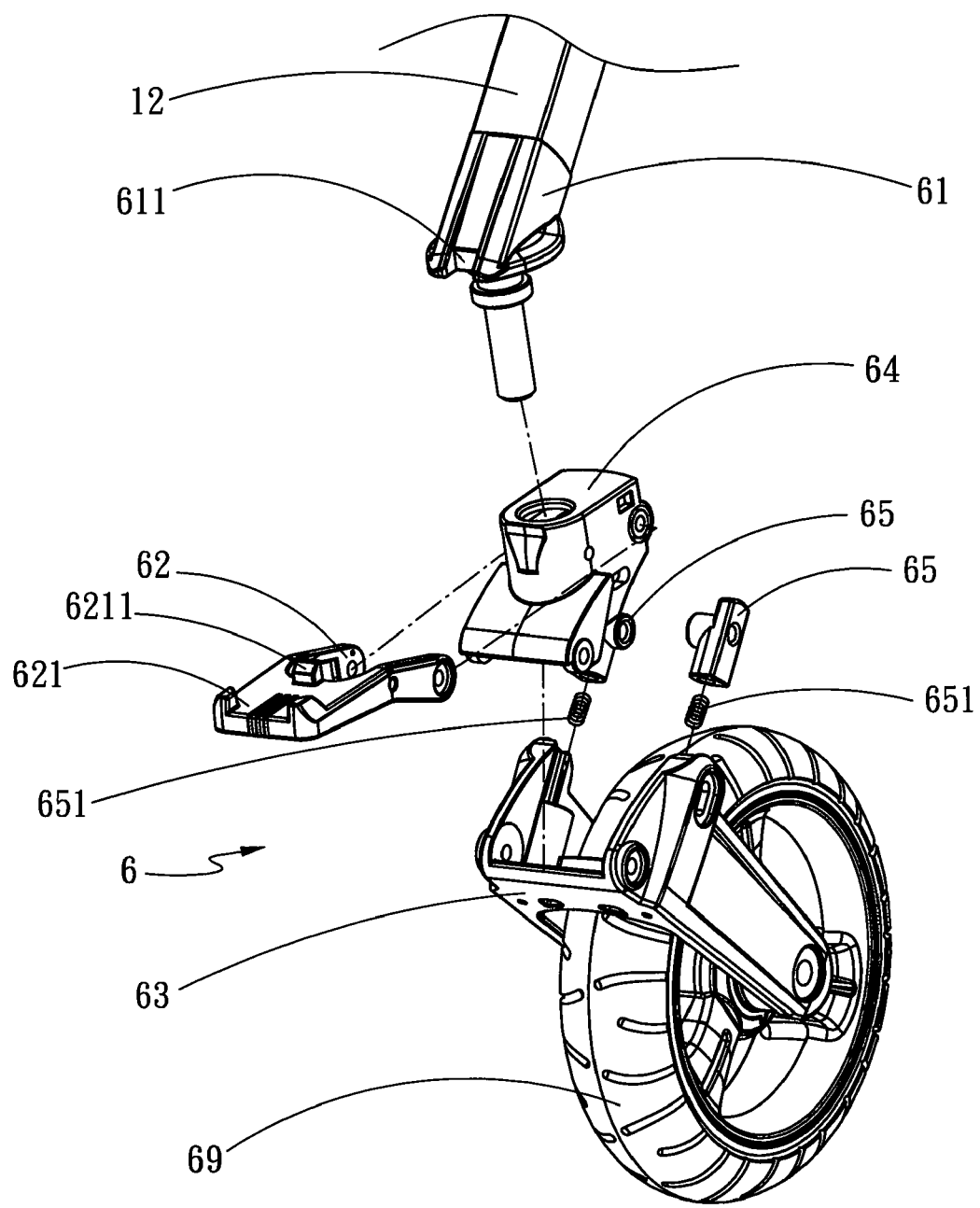
FIG. 8 is a schematic view of a front wheel of the present invention in a coupling condition.
Figure 9:
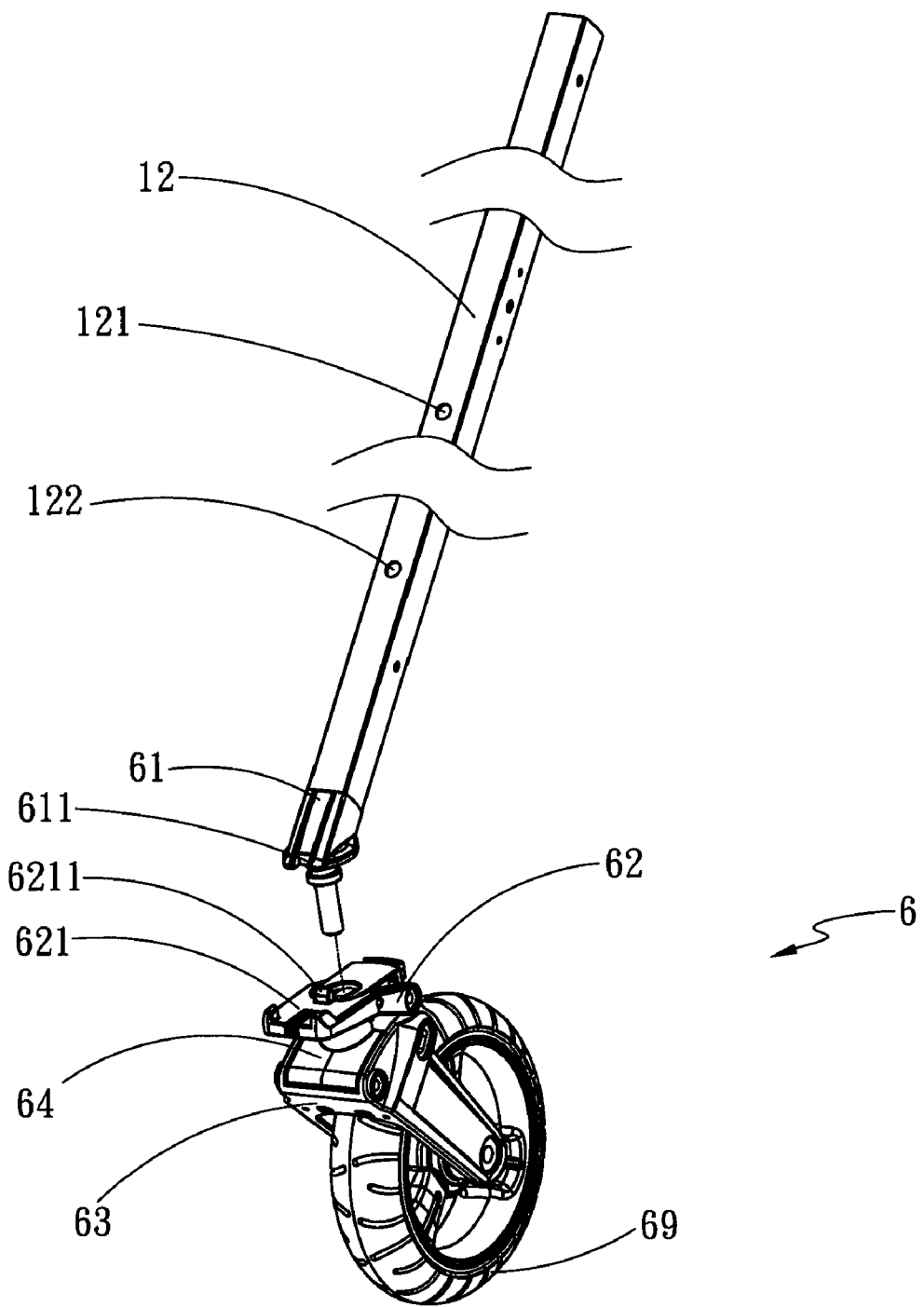
FIG. 9 is a schematic view of the present invention showing the front wheel and safety lock mounting on a front tube.

Referring to FIGS. 1, 8 and 9, the front wheels 6 are installed on the lower end of the front tube 12, and include a direction setting seat 61, a direction setting member 62, a turning seat 64, a front wheel seat 63 and a plurality of front cushions 65. The direction setting seat 61 is located at the lower end of the front tube 12, and has a direction setting trough 611 corresponding to the straight moving direction of the stroller. The turning seat 64 is hinged on a lower end of the direction setting seat 61. The direction setting member 62 is movably located on the turning seat 64 close to the direction setting seat 61 and can be turned with the turning seat 64. The direction setting member 62 also has a front pedal 621 which has a direction setting latch 6211 corresponding to the direction setting trough 611. The front wheel seat 63 straddles two sides of the lower end of the turning seat 64 to hold wheels 69 axially. Each front cushions 65 has an elastic device 651 interposed between the front wheel seat 63 and the turning seat 64 to provide shock absorption effect for the front wheels 6.

Figure 10:
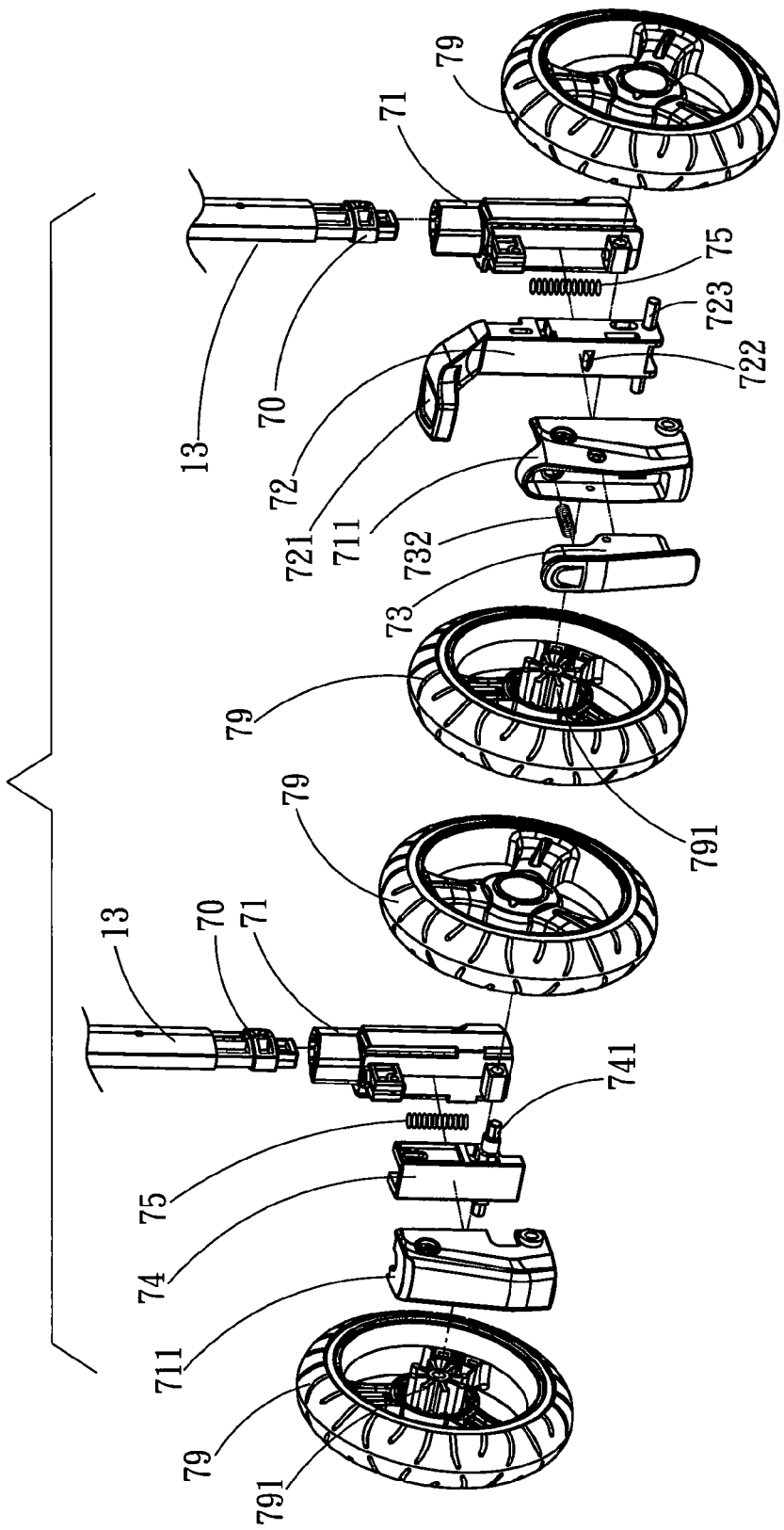
FIG. 10 is a schematic view of the rear wheel set of the present invention in a coupling condition.
Figure 11A:
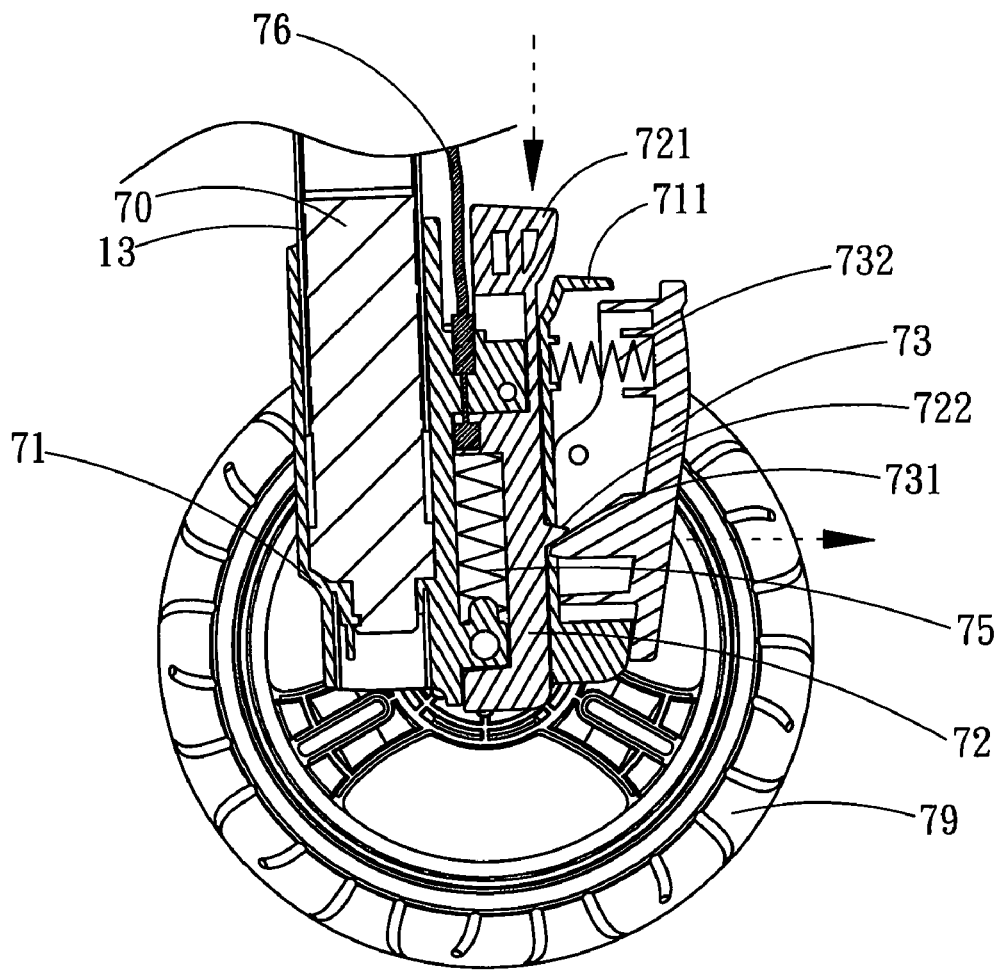
FIG. 11A is a schematic view of the primary brake and release pedal in an operating condition.

Referring to FIGS. 1, 10 and 11A, the rear wheel set 7 is installed on a lower end of the rear tube 13, and comprises a pair of rear cushions 70, a pair of rear wheel seats 71, a primary brake 72, a release pedal 73, a secondary brake 74, two elastic units 75 and a linking member 76. Each of the rear cushions 70 is held inside the lower end of the rear tube 13 and extended outwards to couple with the rear wheel seat 71. The rear wheel seat 71 is coupled on the rear cushions 70 and the rear tube 13 so as to be hinged by rear wheels 79 equipped with brake teeth 791, and also is coupled with a wheel seat cap 711 to cover the primary brake 72 and the secondary brake 74. The primary brake 72 is slidably located on one side of the rear wheel seat 71 and has a rear pedal 721 on an upper end and one elastic unit 75 embedded in the middle portion and a passive release portion 722 near the middle portion, and a first transverse brake bar 723 at a lower end. The release pedal 73 has an active release portion 731 and is hinged on the wheel seat cap 711 at a position to enable the active release portion 731 to conjugate with the passive release portion 722. The wheel seat cap 711 further has an elastic element 732 to keep the active release portion 731 and the passive release portion 722 at locations to maintain mutual latched and driven relationship between them. The secondary brake 74 is slidably located on another side of the rear wheel set 7, and has a second transverse brake bar 741 at the lower end and another elastic unit 75 embedded in the middle. The linking member 76 is a flexible cable to bridge the primary brake 72 and the secondary brake 74. When a user steps the primary brake 72 or the release pedal 73 the secondary brake 74 is activated synchronously in a brake or release condition.

Refer to FIGS. 3, 4, 7A and 7B for operating conditions of the folding control set 5. When the folding control set 5 is at a fixed state in regular conditions, the detent portion 541 stops the boss 511 from moving downwards while the pressing seat 51 is depressed, hence the safety lock 54 provides safety function as desired. To proceed the depressing action, the safety lock 54 has to be unlocked first by moving the detent portion 541 away from the depressing direction of the pressing seat 51. The rotary disk 52 is pushed and turned to drive the flexible link 53 to pull the lower driving lump 41 of the folding driver 4, hence the folding control set 5 can control movement of the folding driver 4. When the rotary disk 5 is turned the lug 521 hits the safety lock 54 to release the fixed state, then is pulled by the linked elastic component 55 to where the detent portion 541 can stop the boss 511.

Refer to FIGS. 3, 5A, 5B and 5C for operation of the folding driver 4 controlled through the flexible link 53. When the flexible link 53 pulls the lower driving lump 41 to slide on the upper driving lump 42, the trough 412 is hit by the washer 433 of the elastic pin 43, the washer 433 is lifted along the trough 412 to raise the elastic pin 43 so that the pin 432 at the lower end thereof escapes the extension hole 121 or retraction hole 122 to allow the handlebar 2 to slide on the front tube 12 to be folded or extended. The upper driving lump 42 and lower driving lump 41 can return to their corresponding positions through the embedded elastic member 44. The elastic pin 43 moves the pin 432 through the elastic element 431 at the upper end to run through the extension hole 121 or retraction hole 122.

Refer to FIGS. 8 and 9 for setting direction of the front wheel 6. Move the direction setting member 62 towards the direction setting seat 61 to make the direction setting latch 6211 of the front pedal 621 turning with the turning seat 64 to latch automatically on the direction setting trough 611. Then the direction of the front wheel 69 is set without the need of moving the wheel 69 in advance.

Figure 11B:
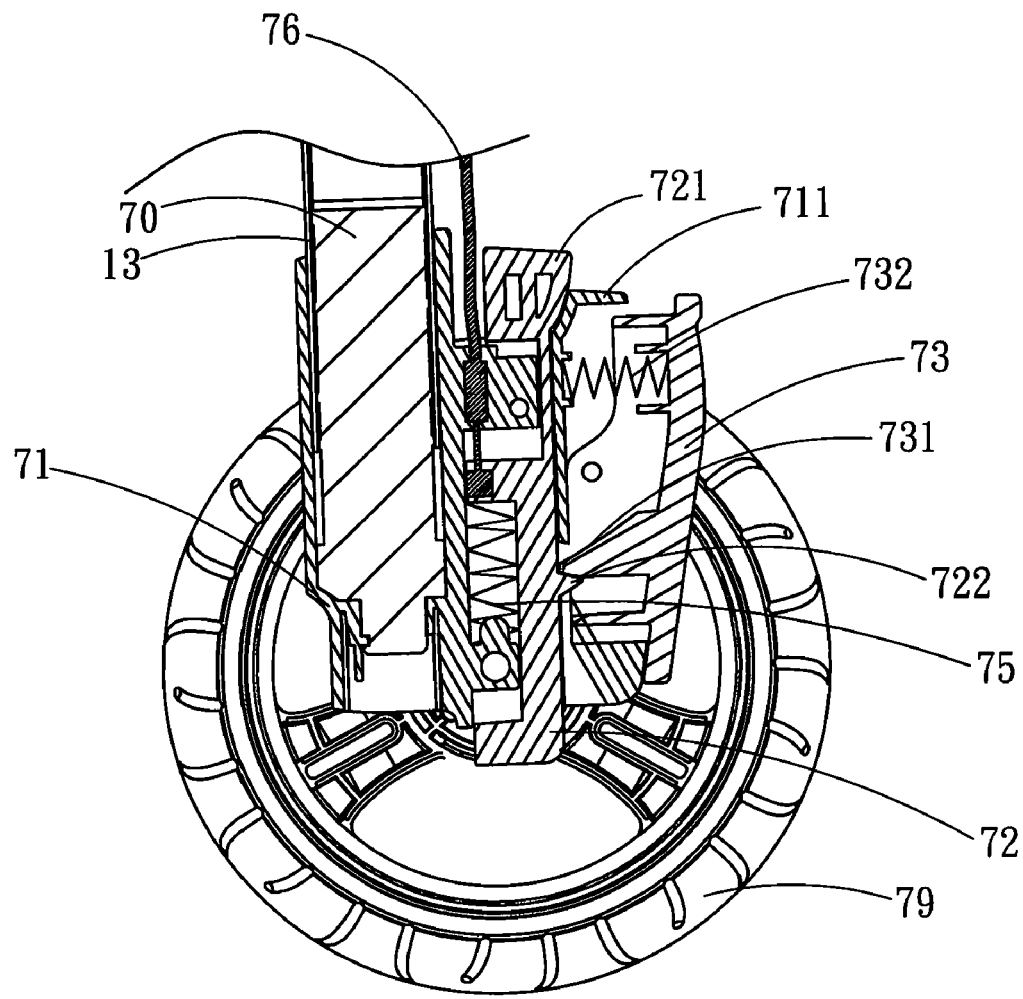
FIG. 11B is a schematic view of the primary brake and the release pedal in a latched condition.

Refer to FIGS. 2, 10 and 11A for setting and releasing brake of the rear wheel set 7. The primary brake 72 and secondary brake 74 are positioned in an up and down manner. When braking is desired, the rear pedal 721 of the primary brake 72 is stepped, the first transverse brake bar 723 latches in the brake teeth 791 of the rear wheel 79; meanwhile, the linking member 76 drives the secondary brake 74 to slide upwards so that the second transverse brake bar 741 of the secondary brake 74 latches in the brake teeth 791 on the same side of the rear wheel 79. The passive release portion 722 of the primary brake 72 and the active release portion 731 of the release pedal 73 are engaged and latched to maintain the brake condition (also referring to FIG. 11B). To release the brake, kick the release pedal 73 turning to disengage the active release portion 731 and the passive release portion 722, the elastic unit 75 embedded in the primary brake 72 and rear wheel seat 71, and in the secondary brake 74 and rear wheel seat 71 is released. Hence the first transverse brake bar 723 of the primary brake 72 and the second transverse brake bar 741 of the secondary brake 71 escape the brake teeth 791 to release the brake at the same time.

Figure 12A:
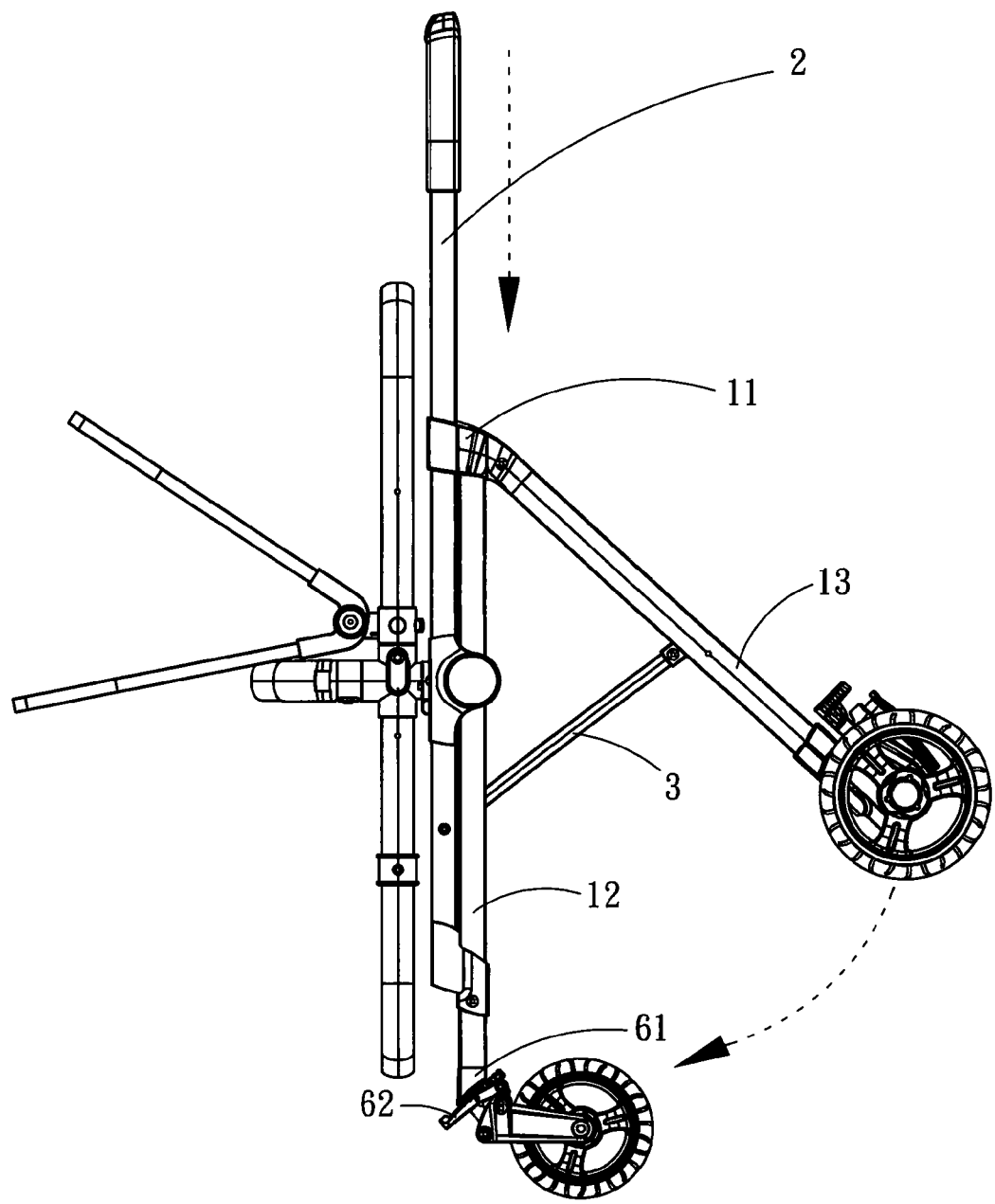
FIG. 12A is a schematic view of the stroller of the invention in an operating condition.
Figure 12B:
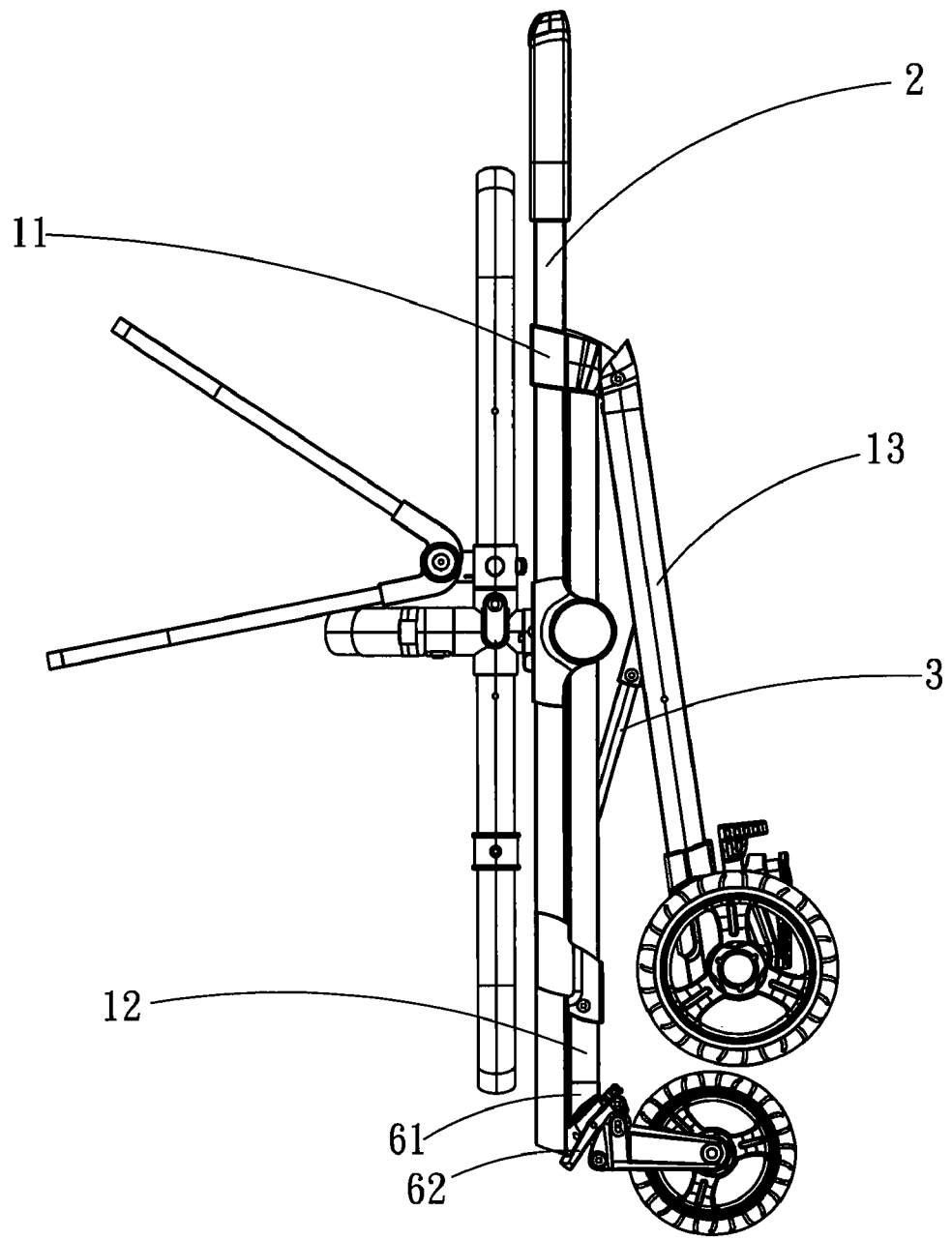
FIG. 12B is a schematic view of the stroller of the invention in a folded condition.

Referring to FIGS. 3, 4 and 5A, by means of the structure set forth above, when the stroller is extended in the fixed condition, the aperture 21 of the handlebar 2 and the extension hole 121 of the front tube 12 are run through by the elastic pin 43 of the folding driver 4 to maintain the extended state. Referring to FIGS. 8 and 9, to fold the stroller, move the direction setting member 62 of the front wheel 6 so that the direction setting latch 6211 automatically latches on the direction setting trough 611 to anchor the front wheel 6. Referring to FIGS. 12A and 12B, to adjust the handlebar 2 in an upright manner, move the safety lock 54 and depress the pressing seat 51 to move the elastic pin 43 of the folding driver 4 away from the extension hole 121 and aperture 21, then the handlebar 2 can be moved downwards on the front tube 12 and folded. Through the linking rack 3, the rear tube 13 is moved close to the front tube 12 in a folding condition. When the aperture 21 is aligned with the retraction hole 122 the elastic pin 43 can be inserted to finish the folding process. During the folding process the lower end of the handlebar 2 hits the front pedal 621 of the front wheel 6 so that the direction setting latch 6211 is disengaged with the direction setting trough 611 to release direction setting to facilitate folding and storing. To maneuver the folding control set 5 during extension, pull the handlebar 2 to the extended position and anchored. Through the linking rack 3 the rear tube 13 also is extended at the same time. The processes previously discussed can be accomplished by a user singlehanded without using two hands or aiding of a foot. It provides a significant improvement over the conventional strollers.

What is claimed is:

1. A stroller having an expanded and fixed state and a folded state, comprising:
    a pair of support racks which respectively include a coupling holder including a lower side fastened to a front tube and hinged a rear tube, the rear tube being movable towards the front tube for folding, and the front tube containing an extension hole near the middle thereof and a folding hole near a lower end thereof;
    a handlebar which is bent and includes two ends to connect and slide on the front tube and includes an aperture corresponding to the extension hole;
    a linking rack to connect with the rear tube and the handlebar to form a linking mechanism for folding;
    a pair of folding drivers which are connected with two ends of the handlebar corresponding to the front tube to control sliding and anchoring of the handlebar on the front tube and include a lower driving lump, a upper driving lump, an elastic pin and an elastic member, the lower driving lump containing a pin hole corresponding to the aperture of the handlebar and a trough around the pin hole that contains sloped sides, the elastic pin running through the pin hole and containing an elastic element at an upper end, a pin at a lower end and a washer near the middle thereof formed at a diameter greater than the pin, the upper driving lump and the lower driving lump being slidable relative to each other, the upper driving lump containing an upper trough corresponding to the elastic element to butt the elastic pin, the elastic member being interposed between the upper driving lump and the lower driving lump;
    a folding control set which is mounted on the handlebar corresponding to the folding drivers to control the folding drivers and includes a pressing seat, a rotary disk, two flexible links, a safety lock and an elastic component, the pressing seat being hinged on the rotary disk through a hinge element to form an eccentric coupling relationship for turning the rotary disk by pressing the pressing seat, the rotary disk containing a lug at a selected position on the perimeter and holding the flexible links at symmetrical locations inside; the safety lock being slidable on the handlebar near the lug of the rotary disk and movable reciprocally on the handlebar through the elastic component;
    a plurality of front wheels which are fastened to a lower end of the front tube and contain a direction setting member to set direction of the front wheels; and
    a rear wheel set which is fastened to a lower end of the rear tube and allowable to be braked synchronously or released to brake concurrently.

2. The stroller of claim 1, wherein the flexible link is connected to the folding driver to control sliding and anchoring of the handlebar on the front tube through the folding control set.

3. The stroller of claim 1, wherein the pressing seat includes a boss near the center of the rotary disk, the safety lock containing a detent portion corresponding to the boss to butt the boss.

4. The stroller of claim 1, wherein the front tube includes a coupling seat close to the middle thereof to couple with a seat frame.

5. The stroller of claim 4, wherein the seat frame is installed with an infant basket or a car seat.

6. The stroller of claim 1, wherein the front wheels include a direction setting seat, a turning seat, a front wheel seat and a plurality of front cushions, the direction setting seat being located on the lower end of the front tube and containing a direction setting trough corresponding to a straight moving direction of the stroller; the turning seat being hinged on a lower end of the direction setting seat, the direction setting member being movably located on the turning seat near the direction setting seat and turnable with the turning seat, the front wheel seat being straddled on two sides of a lower end of the turning seat, the front cushions being interposed between the front wheel seat and the turning seat to provide shock absorption effect for the front wheels.

7. The stroller of claim 6, wherein the direction setting member includes a front pedal which has a direction setting latch mating the direction setting trough.

8. The stroller of claim 6, wherein each of the front cushions contains an elastic device.

9. The stroller of claim 1, wherein the rear wheel set comprises a pair of rear cushions, a pair of rear wheel seats, a primary brake, a release pedal, a secondary brake, two elastic units and a linking member; each of the rear cushions being held inside the lower end of the rear tube and extended outwards to couple with the rear wheel seat, the rear wheel seat being coupled on the rear cushions and the rear tube to be hinged by rear wheels equipped with brake teeth; the primary brake being slidably located on one side of the rear wheel seat and containing a rear pedal on a upper end, a passive release portion near to the middle portion, and a first transverse brake bar at a lower end; and the elastic unit is mounted in the middle portion of primary brake, the release pedal includes an active release portion, and the release pedal is hinged on the rear wheel seat to enable the active release portion to conjugate with the passive release portion; the secondary brake being slidably located on another side of the rear wheel seat and including a second transverse brake bar at a lower end thereof; the linking member connects to the primary brake and the secondary brake such that the primary brake can be driven with the secondary brake synchronously when a user steps the primary brake and so that the first transverse brake bar of the primary brake and the second transverse brake bar of the secondary brake latch in the brake teeth to achieve a concurrent brake state, and the first transverse brake bar and the second transverse brake bar escape the brake teeth to release the brake state when the user kicks the release pedal.

10. The stroller of claim 9, wherein the linking member is a flexible cable.

* * * * *